United States Patent [19]
Lindsley

[11] Patent Number: 5,253,215
[45] Date of Patent: Oct. 12, 1993

[54] METHOD AND APPARATUS FOR HIGH SPEED DETERMINATION OF $J^{th}$ ROOTS AND RECIPROCALS OF $J^{th}$ ROOTS

[75] Inventor: Brett L. Lindsley, Highwood, Ill.

[73] Assignee: Motorola, Inc., Schaumburg, Ill.

[21] Appl. No.: 715,002

[22] Filed: Jun. 13, 1991

Related U.S. Application Data

[63] Continuation of Ser. No. 459,041, Dec. 29, 1989, abandoned.

[51] Int. Cl.$^5$ .............................................. G06F 7/38
[52] U.S. Cl. .................................................. 364/752
[58] Field of Search ............... 364/752, 753, 761, 764, 364/765

[56] References Cited

U.S. PATENT DOCUMENTS 4,607,343  8/1986  Chevillat et al. .................... 364/765

OTHER PUBLICATIONS

"WTL 1032/1033 Floating Point Division/Square Root/IEEE Arithmetic", Weitek Corporation's Application Note, 1983.

Ho, "Approximating Divisions by a Constant", IBM Technical Disclosure Bulletin, vol. 22, No. 4, Sep. 1979, pp. 1554–1557.

Primary Examiner—Long T. Nguyen
Attorney, Agent, or Firm—Darleen J. Stockley

[57] ABSTRACT

A method and apparatus utilizes "Lindsley's Law," a polynomial convergence algorithm, suitable even for high convergence rates, to implement more efficient reciprocal $j^{th}$ root, and hence, $j^{th}$ root itself, computations of desired inputs. The invention emphasizes multiplication, instead of addition, as the iterative operator, thereby reducing error at a rate relative to a power of a selected convergence rate.

12 Claims, 2 Drawing Sheets

METHOD AND APPARATUS FOR HIGH SPEED DETERMINATION OF $J^{th}$ ROOTS AND RECIPROCALS OF $J^{th}$ ROOTS

This is a continuation of application Ser. No. 07/459,041, filed Dec. 29, 1989 and now abandoned.

BACKGROUND OF THE INVENTION

Initially numeric processors computed division and square root determination utilizing a remainder method. This method was inefficient in comparison with remainderless division and square root determination based upon the Newton-Raphson algorithm or simple cases of convergence algorithms. The Newton-Raphson algorithm is an additive convergence algorithm applied to divide and square root approximations. A unified method of developing convergence algorithms applicable to higher convergence rates has not heretofore been developed.

There is a need for formulation of convergence algorithms applicable to higher convergence rates so as to improve efficiency in mathematical computations of $j^{th}$ roots.

SUMMARY OF THE INVENTION

This need for improved efficiency in mathematical computations of $j^{th}$ roots, utilizing a convergence algorithm formulated so as to be applicable to a selected convergence rate, including higher order convergence rates, is substantially met by the present invention. A numeric processor (NP) is set forth that generates convergence polynomials relative to desired convergence rates such that reciprocal $j^{th}$ roots of inputs may be more efficiently computed.

Underlying the concept of the present invention is the following rationale: recognizing that if, for a given input x, $x*f^j=1$, then $f=x^{-1/j}$. If f is represented as a series of factors, for example $f=f_1*f_2*f_3$, then $x*(f_1*f_2*f_3)^j=1$, and it follows that $x*[(f_1)^j*(f_2)^j*(f_3)^j]=1$ and $f_1*f_2*f_3 = x^{-1/j}$. Thus, driving x toward 1.0 may occur in multiple steps. In general, f is a function of x.

Responsive to input values for a desired $j^{th}$ root and a desired convergence rate of a selected input value, a NP determines a reciprocal of an approximate such root, in one embodiment obtaining the approximate such root from a read-only memory device. After raising the reciprocal of the approximate root to the $j^{th}$ power and multiplying same by the selected input value to obtain a near unity value, the NP determines a convergence factor relative to the following three values: the desired convergence rate, the desired $j^{th}$ root, and the near unity value. The convergence factor is determined as an approximate solution $f_j[m](x)$ of an error equation $x*\{f_j[m](x)\}^j = 1 - \Delta^m$, where x is a near unity value, j represents a desired $j^{th}$ root, m is a desired convergence rate, $f_j[m](x)$ is an $m-1^{th}$ order polynomial in terms of x that when raised to the $j^{th}$ power and multiplied by x causes an error $\Delta$ to decrease by the $m^{th}$ power, and $\Delta$ is $1-x$.

Determination of $f_j[m](x)$ is as follows: $1-\Delta$ is substituted for x in the error equation; $f_j[m](x)$ is taken to be $f_j[m](\Delta)$, where $f_j[m](\Delta) = 1 + A_1\Delta^1 + A_2\Delta^2 + A_3\Delta^3 + \ldots A_{m-1}\Delta^{m-1}$, having coefficients $A_1$ through and including $A_{m-1}$; $0 < 1 - \Delta < 2$; $\{f_j[m](x)\}^j$ is expanded and multiplied by $(1-\Delta)$ as indicated; all terms that contain $\Delta^p$ such that $p > m$ are eliminated, obtaining an equation with coefficients $g_1$ through $g_m$ of the form $1 + g_1\Delta^1 + g_2\Delta^2 + g_3\Delta^3 \ldots + g_m\Delta^m = 1 - k\Delta^m$; the coefficients of terms $\Delta^1, \Delta^2, \Delta^3, \ldots, \Delta^{m-1}$ are equated to zero, yielding solutions for the $A_1$ through $A_{m-1}$ coefficients above; $(1-x)$ is substituted for $\Delta$ to obtain the convergence factor $f_j[m](x) = 1 + K_1 x + K_2 x^2 + K_3 x^3 \ldots + K_{m-1}x^{m-1}$, having coefficients $K_1$ through and including $K_{m-1}$, where the $K_1 - K_{m-1}$ coefficients are functions of the $A_1 - A_{m-1}$ coefficients.

The NP raises the convergence factor to the $j^{th}$ power and multiplies by x to obtain a new value for x. The NP multiplies the approximate reciprocal $j^{th}$ root of the selected input by the convergence factor, determining a new approximation of an approximate reciprocal $j^{th}$ root. The steps of determining a convergence factor through and including determining a new approximation of a reciprocal $j^{th}$ root of a selected input are iterated until a solution with a desired degree of accuracy is obtained. The repeated iterations drive x toward 1 and the product of the convergence factors toward the reciprocal $j^{th}$ root, i.e., $x*\{f_j[m](x)\}^j \to 1$ and $\pi\{f_j[m](x)\} \to 1/(j^{th}\ root\ of\ x)$.

It will be obvious to one skilled in the art that the approximate $j^{th}$ root of the selected input may be obtained readily from the approximate reciprocal $j^{th}$ root, for example, utilizing $S^{1/j} = (S^{-1/j})^{-1}*S$ or $(S^{-1/j})^{-1}$.

BEST MODE FOR CARRYING OUT THE INVENTION

Figure 1:
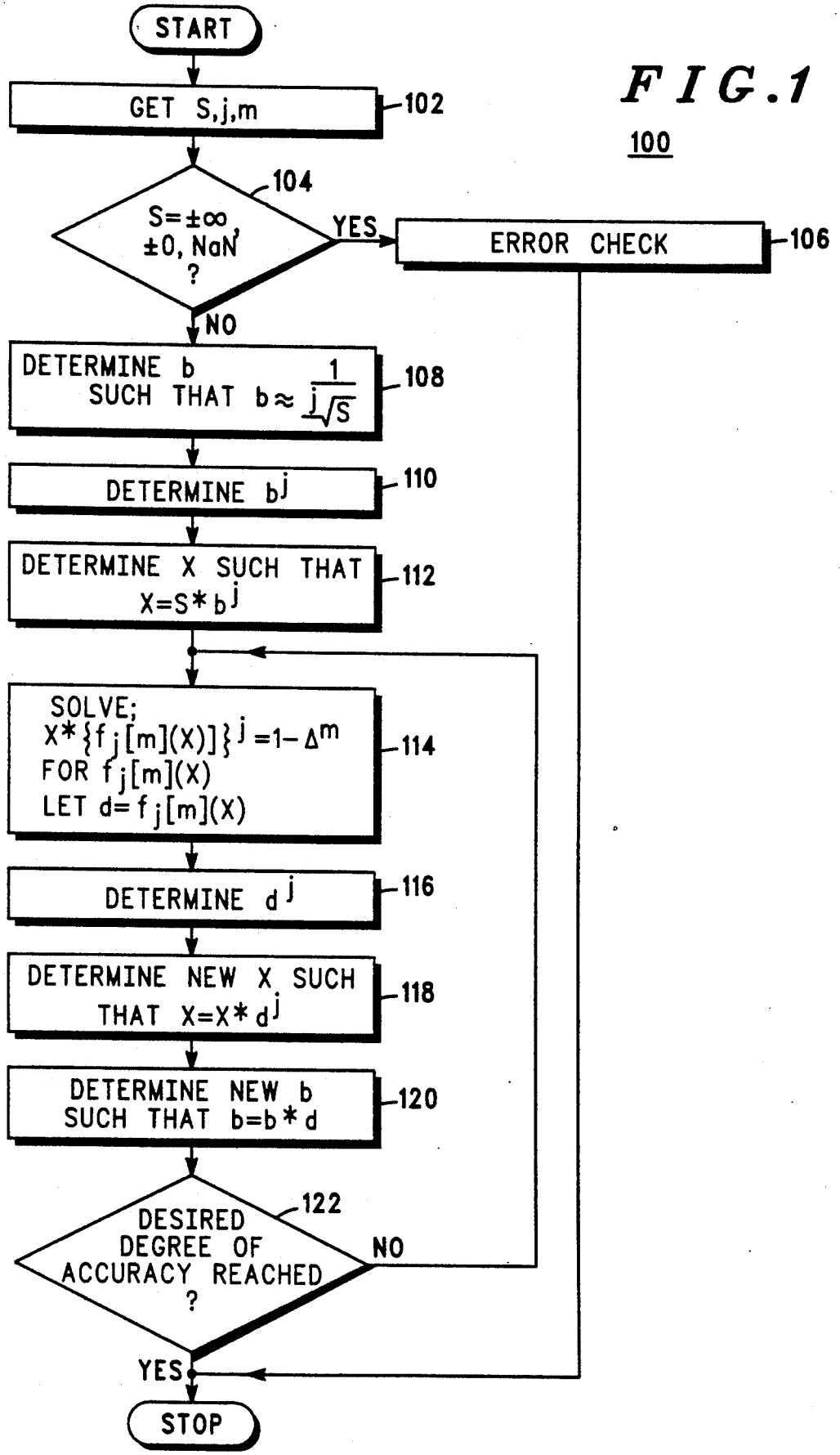
FIG. 1 is a general flow chart of an implementation of the invention incorporating an application of an approximation strategy.

FIG. 1, generally depicted by the numeral 100, illustrates one embodiment of steps executed by a numeric processor (NP) incorporating the present invention. An error equation is expanded and solved through strategic elimination of selective terms, together with assignment of a zero value to appropriate coefficients, providing a convergence factor that is implemented iterably to determine a reciprocal of a desired root of an input value until a solution with a desired degree of accuracy is obtained.

The NP, utilizing at least one electrical signal, provides an input value of S, an input value m reflecting a desired convergence rate, and an input value j reflecting a desired $j^{th}$ root (102). The NP utilizes at least one electrical signal to determine if $S = \pm\infty$, $\pm 0$, or Not-a-Number (NaN) (104). If $S = \pm\infty$, $\pm 0$, or NaN, NP utilizes an error check device (106), and stops processing. It is apparent that the order of input data may be varied, it only being necessary that the S value be input prior to the NP's check on whether $S = \pm\infty$, $\pm 0$, or NaN. If S is other than $\pm\infty$, $\pm 0$, or NaN, the NP utilizes at least one electrical signal to determine a value b such that b is an approximation to the reciprocal of the $j^{th}$ root of S (108). Then the NP employs at least one electrical signal to determine b to the $j^{th}$ power (110). Next, the NP utilizes at least one electrical signal to determine a value of x such that $x = S*b^j$, wherein $0 < x < 2$, x being substantially close to 1.0 (112).

The NP then employs at least one electrical signal to manipulate an error equation, $x*\{f_j[m](x)\}^j = 1 - \Delta^m$, wherein $f_j[m](x) = 1 + A_1 x + A_2 x^2 + A_3 x^3 \ldots + A_{m-1}x^{m-1}$, having coefficients $A_1$ through and including $A_{m-1}$, and $\Delta = 1 - x$, $\Delta$ being error, and achieve a value for $f_j[m](x)$, thereafter referred to as d, in the following manner: $f_j[m](x)$ is an $m-1^{th}$ polynomial in $\Delta$ that is expanded by being raised to the $j^{th}$ power and multiplied by $(1-\Delta)$ as indicated to obtain an equation of the form $1+g_1\Delta^1+g_2\Delta^2+g_3\Delta^3 \ldots +g_m\Delta^m=1-k\Delta^m$, having coefficients $g_1$ through and including $g_m$; the coefficients $g_1$ through and including $g_{m-1}$ are equated to zero and all terms that contain $\Delta^p$ such that $p>m$ are eliminated such that solutions for $A_1$ through and including $A_{m-1}$ are obtained; $(1-x)$ is substituted for $\Delta$ to obtain an equation of the form $f_j[m](x)=1+K_1x+K_2x^2+K_3x^3 \ldots +K_{m-1}x^{m-1}$, having coefficients $K_1$ through and including $K_{m-1}$ such that the $K_1-K_{m-1}$ coefficients are functions of the $A_1-A_{m-1}$ coefficients, that is referred to as d and is utilized as a convergence factor (114). The NP employs at least one electrical signal to raise d to the $j^{th}$ power (116), then to determine a new x such that $x=x*d^j$ (118). Next the NP utilizes at least one electrical signal to determine a new b such that $b=b*d$ (120) and such that b appears as an electrical output signal.

The steps of the immediately preceding paragraph are iterated until a solution with a desired degree of accuracy is obtained (122), at which time the NP stops. The degree of accuracy may be determined by how close x is to 1.0, or equivalently, how close $\Delta$ is to zero.

When j is unknown or fixed, then $\{f_j[m](x)\}^j$ may be expanded using the binomial theorem, utilizing only the first m terms of a series generated by that theorem.

For example, for quadratic convergent reciprocal square root, wherein $m=2$ and $j=2$, the following steps derive $f_2[2](x)$ according to the present invention:

1. The error equation is $$(1-\Delta)\{f_j[m](\Delta)\}^j \approx 1-\Delta^m$$

$$(1-\Delta)\{f_2[2](\Delta)\}^2 \approx 1-\Delta^2$$

$$(1-\Delta)(1+A_1\Delta)^2 \approx 1-\Delta^2$$

2. Expand the error equation eliminating terms containing $\Delta^p$ such that $p>2$, obtaining $\Delta^p$ terms with coefficients related to the A coefficients:

$$(1-\Delta)(1+2A_1\Delta+\Delta^2) \approx 1-\Delta^2$$

$$1+\Delta(2A_1-1)+\Delta^2(1-2A_1) \approx 1-\Delta^2$$

3. Set the coefficient of the $\Delta$ term to zero, and solve for $A_1$:

$$2A_1-1=0$$

$$A_1=\tfrac{1}{2}$$

4. Substitute the value obtained for $A_1$ into $f_2[2](\Delta)=1+A_1\Delta$, and relate solution to x:

$$f_2[2](\Delta)=1+(\tfrac{1}{2})\Delta$$

Since $x=1-\Delta$, $f_2[2](x)=1.5-0.5x$

The algorithm for the reciprocal square root is then: For an input of magnitude S, Initialize: $f \approx 1/(S)^{\tfrac{1}{2}}$ Let $x = S * f^2$ Let $b = f$ Iterate: $d = 1.5 - 0.5x$ $x = x * d^2$ $b = b * d$ Terminate: $1/(S)^{\tfrac{1}{2}} = b$ The method of the invention, being the first such method known to the inventor to construct a general approach applicable even to solution of higher order roots, is designated "Lindsley's Law."

It will be apparent to those skilled in the art that the reciprocal of the $j^{th}$ root of an input may be utilized to obtain the $j^{th}$ root of that input.

Additionally, it will be apparent to those skilled in the art that if j and m are selected as constants, the polynomial $f_j[m](x)$ will be dictated by j and m, and may be determined at a suitable time. The method of the invention may then proceed to utilize the determined polynomial as necessary without redetermination during the implementation of the preselected j and m constants.

Further, it will be apparent that error($\Delta$) decreases by the square for each iteration in quadratic convergence where $m=2$, by the cube for each iteration in cubic convergence where $m=3$, and so on in this related manner.

In an implementation of the present invention in which convergent reciprocal such that $j=1$ is desired, an application useful for division algorithms in addition to other uses, it is apparent that non-zero terms of $f_j[m](x)$ are approximated to give $$d=f_j[m](x)=1+(1/j)[(1-x)^1+(1-x)^3 \ldots +(1-x)^{m-1}],$$

with $j=1$, that may be simplified to:

$$d = f_1[1](x) = 1$$

$$d = f_1[2](x) = 2 - x$$

$$d = f_1[3](x) = 3 - 3x + x^2$$

$$d = f_1[4](x) = 4 - 6x + 4x^2 - x^3$$

$$d = f_1[5](x) = 5 - 10x + 10x^2 - 5x^3 + x^4$$

...

and $$d = f_1[m](x) = 1 + (1 - x)^1 + (1 - x)^2 + (1 - x^3) \ldots$$

$$+ (1 - x)^{m-1}$$

for different selected convergence rates.

In another implementation of the present invention in which convergent reciprocal square root such that $j=2$ is desired, an application useful for square root algorithms in addition to other uses, it is apparent that non-zero terms of $f_j[m](x)$ are approximated to give $$d = f_j[m](x) = 1 + (1-x)^1(1/j) + (1-x)^2[(1/j) -$$
$$(j-1)/(2j^2)] + (1-x)^3[(1/j) -$$
$$(j-1)/(2j^2) - (j-1)/(2j^3)] +$$
$$(1-x)^4[(1/j) - (j-1)/(2j^2) -$$
$$(j-1)/(2j^3) - (j-1)/(2j^4)] + \ldots +$$
$$(1-x)^{m-1}[(1/j) - (j-1)/(2j^2) -$$
$$(j-1)/(2j^3) \ldots - (j-1)/(2j^{m-1})]$$

with j=2, which may be simplified to:

$$d = f_2[1](x) = 1$$

$$d = f_2[2](x) = 1 + (1-x)^1(1/2) = 1.5 - .5x$$

$$d = f_2[3](x) = 1 + (1-x)^1(1/2) +$$
$$(1-x)^2[(1/2) - (1/2^3)]$$
$$= 1.875 - 1.25x + .375x^2$$

$$d = f_2[4](x) = 1 + (1-x)^1(1/2) + (1-x)^2[(1/2) -$$
$$(1/2^3)] + (1-x)^3[(1/2) - (1/2^3) -$$
$$(1/2^4)]$$
$$= 2.1875 - 2.1875x + 1.3125x^2 - .3125x^3$$

$\ldots$ $$d = f_2[m](x) = 1 + (1-x)^1(1/2) + (1-x)^2[(1/2) -$$
$$1/(2^3)] + (1-x)^3[(1/2) - 1/(2^3) -$$
$$1/(2^4)] + (1-x)^4[(1/2) - 1/(2^3) -$$
$$1/(2^4) - 1/(2^5)] + \ldots +$$
$$(1-x)^{m-1}[(1/2) - 1/(2^3) -$$
$$1/(2^4) \ldots - 1/(2^m)]$$

for different selected convergence rates.

It will apparent to one skilled in the art that in a similar manner to that described above, this invention may be implemented by selecting a fixed convergence rate m, and utilizing different selected values for j.

In an implementation for quadratic convergence rate, wherein m=2, $f_j[2](\Delta) = 1 + \Delta/j$, or equivalently, $f_j[m](x) = (j+1-x)/j$, yielding the following quadratic convergence functions for various reciprocal roots:

$$f_1[2](x) = 2 - x$$

$$f_2[2](x) = 1.5 - 0.5x$$

$$f_3[2](x) = (4/3) - (\tfrac{1}{3})x$$

In an implementation for cubic convergence rates, wherein m=3, $f_j[3](\Delta) = 1 + (\Delta/j) + \Delta^2[1 - (j-1)/(2j)]/j$, or equivalently, $f_j[3](x) = (2j^2 + 3j + 1)/(2j)^2 - x(2j+1)/j^2 + x^2(j+1)/(2j^2)$, yielding the following cubic convergence functions for various reciprocal $j^{th}$ roots:

$$f_1[3](x) = 3 - 3x + x^2$$

$$f_2[3](x) = 1.875 - 1.25x + 0.375x^2$$

$$f_3[3](x) = (14/9) - (7/9)x + (2/9)x^2$$

Figure 2:
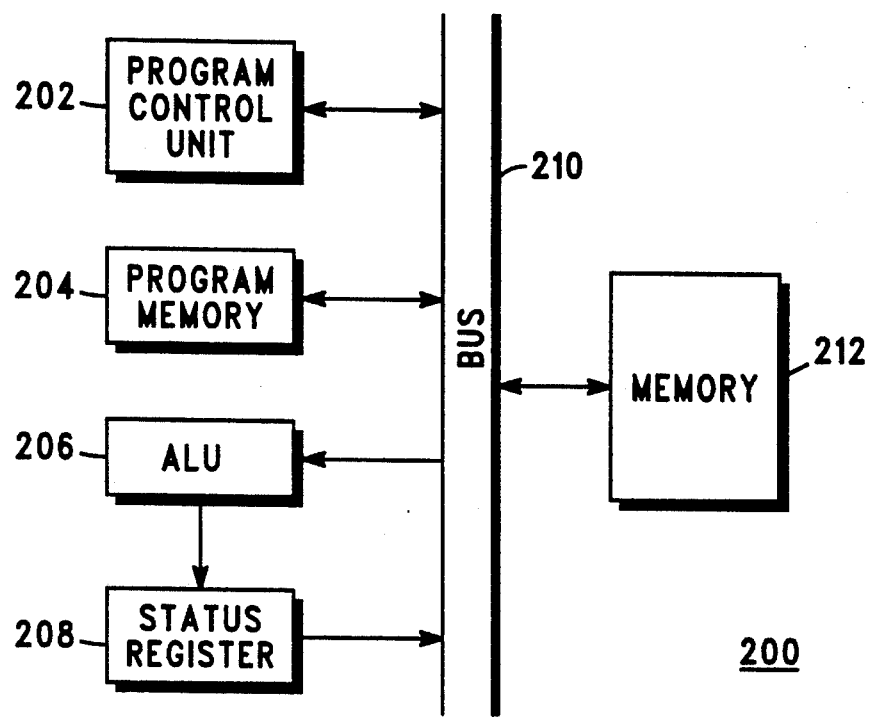
FIG. 2 is a block diagram of a computer hardware implementation of the invention.

FIG. 2, generally depicted by the numeral 200, illustrates a hardware implementation of the present invention. A computer program for implementation of the present invention may be stored in the program memory (204), other memory (212), may be embodied in hardware in the ALU (206), or may be any combination utilizing at least two of the following: program memory, other memory, and hardware in the ALU (204, 212, 206). In one embodiment, the program control unit (202), typically including at least a second selecting unit and a third selecting unit as is clear from the method described above, utilizes the bus (210) to select a program to implement the present invention, and the status register (208) determines whether the selected input value is $\pm\infty$, $\pm 0$, or NaN, the program control unit (202) and the status register (208) typically providing at least a first selecting unit as is clear from the method described above.

If the selected input value is other than $\pm\infty$, $\pm 0$, or NaN, the ALU (206), including a first determining unit having a read-only-memory (ROM) unit, performs the previously described manipulations of values in application of the determination of an electrical output value for a reciprocal of a desired $j^{th}$ root of an input value, based on an electrical input value reflecting a desired convergence rate and an electrical input value reflecting a magnitude for a desired $j^{th}$ root. It will again be apparent to one skilled in the art that an electrical output value for an approximation of a $j^{th}$ root of a selected input may be attained by obtaining a reciprocal of the reciprocal of the approximation of the $j^{th}$ root of the selected input.

In one embodiment, to determine an initial approximation of a reciprocal of a $j^{th}$ root of a selected input, the first determining unit generates an estimate of same that is stored in 8 bits of binary memory.

In another embodiment, an approximation of that reciprocal may be determined from a table of values that is stored in program memory (204) or other memory (212) such as a ROM of the first determining unit.

In one embodiment the method of the invention allocates data storage and manipulation devices such that the method is executed as described above.

What is claimed is:

1. A numeric processor for processing electrical signals to determine a reciprocal of a desired $j^{th}$ root of an input value S other than $S = \pm\infty$, $\pm 0$, or Not-a-Number (NaN), based on an input value m reflecting a desired convergence rate m in a selected error equation and an input value j reflecting a magnitude of j for a desired reciprocal $j^{th}$ root, comprising:

A) first selecting means for applying electrical signals responsive to the input value S to select an input value S other than $S = \pm\infty$, $\pm 0$, or NaN;

B) second selecting means for applying electrical signals responsive to the input value j to select j;

C) third selecting means for applying electrical signals responsive to the input value m to select m;

D) a read-only memory storage unit, for applying electrical signals responsive to the first selecting means and the second selecting means to determine b such that b is approximately equal to the reciprocal of the $j^{th}$ root of S;

E) second determining means for applying electrical signals responsive to the second selecting means and the read only memory storage unit to determine $b^j$ such that b is raised to the power of j;

F) third determining means for applying electrical signals responsive to the first selecting means and the second determining means to determine x such that $x = S*b^j$;

G) fourth determining means for applying electrical signals responsive to the second selecting means, the third selecting means, and the third determining means to determine a convergence factor d such that d is obtained as a solution of the selected error equation $x*\{f_j[m](x)\}^j = 1 - \Delta^m$, also expressible as $(1-\Delta)*\{f_j[m](\Delta)\}^j = 1 - \Delta^m$, noting that as $f_j[m](1-\Delta)$ is a function of $\Delta$, then $f_j[m](\Delta)$ is also a function of $\Delta$, where:

$\Delta = 1 - x$;

$f_j[m](\Delta)$ is an $m-1^{th}$ order polynomial in terms of $\Delta$ that when raised to the $j^{th}$ power and multiplied by $(1-\Delta)$ causes an error $\Delta$ to decrease by the $m^{th}$ power;

$f_j[m](\Delta) = 1 + A_1\Delta^1 + A_2\Delta^2 + A_3\Delta^3 . \ldots + A_{m-1}\Delta^{m-1}$;

$0 < 1 - \Delta < 2$;

$\{f_j[m](\Delta)\}^j$ is expanded and multiplied by $(1 - \Delta)$ as indicated; all terms that contain $\Delta^p$ such that $p > m$ are eliminated, obtaining an equation with coefficients $g_1$ through $g_m$ of the form $$1 + g_1\Delta^1 + g_2\Delta^2 + g_3\Delta^3 \ldots + g_m\Delta^m = 1 - k\Delta^m;$$

the coefficients of terms $\Delta^1, \Delta^2, \Delta^3, \ldots, \Delta^{m-1}$ are equated to zero yielding solutions for the $A_1$ through $A_{m-1}$ coefficients above;

$(1-x)$ is substituted for $\Delta$ to obtain $f_j[m](x) = 1 + K_1x + K_2x^2 + K_3x^3 \ldots + K_{m-1}x^{m-1}$, where the K's are functions of the A's;

such that convergence factor $d = f_j[m](x)$;

H) fifth determining means for applying electrical signals responsive to the second selecting means and the fourth determining means to determine $d^j$ such that d is raised to the power of j;

I) sixth determining means for applying electrical signals responsive to the third determining means and the fifth determining means to determine a new x such that $x = x*d^j$; and J) seventh determining means for applying electrical signals responsive to the first determining means and the fourth determining means to determine a new b such that $b = b*d$ and b appears as an output signal.

2. The apparatus of claim 1, further including data manipulation and storage means responsive to the fourth determining means, the fifth determining means, the sixth determining means, and the seventh determining means for iterating determinations G, H, I, and J until a solution with a desired degree of accuracy is obtained.

3. The apparatus of claim 1, wherein the means for selecting an input value S other than $S = \pm \infty$, $\pm 0$, or NaN is an error check device.

4. The apparatus of claim 1, wherein the fourth determining means comprises:

A) first storage and manipulation means for applying electrical signals responsive to the second selecting means, the third selecting means, and the third determining means to store and manipulate the selected error equation $(1-\Delta)*\{f_j[m](\Delta)\}^j = 1 - \Delta^m$ such that $$(1-\Delta)*(1 + A_1\Delta + A_2\Delta^2 + A_3\Delta^3 \ldots + A_{m-1}\Delta^{m-1})^j \approx 1 - \Delta^m;$$

B) second storage and manipulation means for applying electrical signals responsive to the first storage and manipulation means to expand $(1 + A_1\Delta + A_2\Delta^2 + A_3\Delta^3 \ldots + A_{m-1}\Delta^{m-1})^j$ by utilizing the binomial theorem to obtain the following product:

$$(1 - \Delta) * [1 + j(A_1\Delta + A_2\Delta^2 + A_3\Delta^3 \ldots + A_{m-1}\Delta^{m-1}) +$$

$$j(j-1)/2! * (A_1\Delta + A_2\Delta^2 + A_3\Delta^3 \ldots + A_{m-1}\Delta^{m-1})^2 +$$

$$j(j-1)(j-2)/3! * (A_1\Delta + A_2\Delta^2 + A_3\Delta^3 \ldots + A_{m-1}\Delta^{m-1})^3 +$$

$$\ldots ] \approx 1 - \Delta^m;$$

and to utilize terms less than or equal to the $\Delta^m$ term;

C) third storage and manipulation means for applying electrical signals responsive to the second storage and manipulation means to obtain the product indicated in step B and to disregard terms above $\Delta^m$, yielding an equation of the form:

$$1 + g_1\Delta^1 + g_2\Delta^2 + g_3\Delta^3 \ldots + g_m\Delta^m = 1 - k\Delta^m$$

where $g_1, g_2, g_3, \ldots g_m$ are expressions for the coefficients of the $\Delta, \Delta^2, \Delta^3, \ldots \Delta^m$ terms;

D) fourth storage and manipulation means for applying electrical signals responsive to the third storage and manipulation means to set the coefficients $g_1$ through and including $g_{m-1}$ equal to zero and to solve for the coefficients $A_1$ through and including $A_{m-1}$, yielding an error equation of the form $1 + g_m\Delta^m = 1 - k\Delta^m$;

E) fifth storage and manipulation means for applying electrical signals responsive to the fourth storage and manipulation means to substitute $A_1, A_2, A_3, \ldots A_{m-1}$ into the $m-1^{th}$ order polynomial $f_j[m](\Delta)$ to obtain $$f_j[m](\Delta) = 1 + A_1\Delta + A_2\Delta^2 + A_3\Delta^3 \ldots + A_{m-1}\Delta^{m-1}$$

and to substitute $\Delta = 1 - x$ such that $$f_j[m](x) = 1 + K_1x + K_2x^2 + K_3x^3 \ldots + K_{m-1}x^{m-1}$$

where K's are functions of the A's and such that $d = f_j[m](x)$, d appearing as an output signal.

5. The apparatus of claim 1, wherein the fourth determining means includes:

for convergent reciprocal such that $j = 1$ is desired, an application useful for division algorithms, data storage and manipulation means such that non-zero terms of $f_j[m](x)$ are approximated to give $$d = f_j[m](x) = 1 + (1/j)[(1-x)^1 + (1-x)^2 + (1-x)^3 \ldots + (1-x)^{m-1}]$$

with $j = 1$, which may be simplified to:

$d = f_1[1](x) = 1$ $d = f_1[2](x) = 2 - x$ $d = f_1[3](x) = 3 - 3x + x^2$ $d = f_1[4](x) = 4 - 6x + 4x^2 - x^3$ $d = f_1[5](x) = 5 - 10x + 10x^2 - 5x^3 + x^4$

-continued $$d = f_1[m](x) = 1 + (1-x)^1 + (1-x)^2 + (1-x)^3 \ldots$$
$$+ (1-x)^{m-1}$$

for different selected convergence rates.

6. The apparatus of claim 1, wherein the fourth determining means includes:

for convergent reciprocal square root such that $j=2$ is desired, an application useful for square root algorithms, data storage and manipulation means such that non-zero terms of $f_j[m](x)$ are approximated to give $$\begin{aligned}d = f_j[m](x) = \;& 1 + (1-x)^1(1/j) + (1-x)^2[(1/j) - \\ & (j-1)/(2j^2)] + (1-x)^3[(1/j) - \\ & (j-1)/(2j^2) - (j-1)/(2j^3)] + \\ & (1-x)^4[(1/j) - (j-1)/(2j^2) - \\ & (j-1)/(2j^3) - (j-1)/(2j^4)] + \ldots + \\ & (1-x)^{m-1}[(1/j) - (j-1)/(2j^2) - \\ & (j-1)/(2j^3) \ldots - (j-1)/(2j^{m-1})]\end{aligned}$$

with $j=2$, which may be simplified to:

$$d = f_2[1](x) = 1$$
$$d = f_2[2](x) = 1 + (1-x)^1(1/2) = 1.5 - .5x$$
$$\begin{aligned}d = f_2[3](x) &= 1 + (1-x)^1(1/2) + \\ & (1-x)^2[(1/2) - (1/2^3)] \\ &= 1.875 - 1.25x + .375x^2\end{aligned}$$
$$\begin{aligned}d = f_2[4](x) &= 1 + (1-x)^1(1/2) + (1-x)^2[(1/2) - \\ & (1/2^3)] + (1-x)^3[(1/2) - (1/2^3) - \\ & (1/2^4)] \\ &= 2.1875 - 2.1875x + 1.3125x^2 - .3125x^3\end{aligned}$$

$$\begin{aligned}d = f_2[m](x) = \;& 1 + (1-x)^1(1/2) + (1-x)^2[(1/2) - \\ & 1/(2^3)] + (1-x)^3[(1/2) - 1/(2^3) - \\ & 1/(2^4)] + (1-x)^4[(1/2) - 1/(2^3) - \\ & 1/(2^4) - 1/(2^5)] + \ldots + \\ & (1-x)^{m-1}[(1/2) - 1/(2^3) - \\ & 1/(2^4) \ldots - 1/(2^m)]\end{aligned}$$

for different selected convergence rates.

7. The apparatus of claim 1, wherein the fourth determining means includes: for quadratic convergence rate, wherein $m=2$, data storage and manipulation means such that non-zero terms of $f_j[m](x)$ are approximated to give $f_j[2](\Delta)=1+\Delta/j$, or equivalently, $f_j[m](x)=(j+1-x)/j$, yielding the following quadratic convergence functions for various reciprocal roots:

$$f_1[2](x)=2-x$$

$$f_2[2](x)=1.5-0.5x$$

$$f_3[2](x)=(4/3)-(\tfrac{1}{3})x.$$

8. The apparatus of claim 1, wherein the fourth determining means includes: for cubic convergence rates, wherein $m=3$, data storage and manipulation means such that non-zero terms of $f_j[m](x)$ are approximated to give $f_j[3](\Delta)=1+(\Delta/j)+\Delta^2[1-(j-1)/(2j)]/j$, or equivalently, $$f_j[3](x)=(2j^2+3j+1)/(2j^2)-x(2j+1)/j^2+x^2(j+1)/(2j^2),$$

yielding the following cubic convergence functions for various reciprocal $j^{th}$ roots:

$$f_1[3](x)=3-3x+x^2$$

$$f_2[3](x)=1.875-1.25x+0.375x^2$$

$$f_3[3](x)=(14/9)-(7/9)x+(2/9)x^2.$$

9. A method for utilizing electrical signals to allocate data storage means and data manipulation means of a computer program stored within a computer storage medium so as to expedite and improve a process of determining a reciprocal of a desired jth root of an input value S other than $S=\pm\infty$, $\pm 0$, or Not-a-Number (NaN), based on an input value m reflecting a desired convergence rate m and an input value j reflecting a magnitude of j for a desired $j^{th}$ root that substantially determine a convergence factor d, comprising the steps of:

A) allocating at least a first data and manipulation input device for selecting and storing an input value S other than $S=\pm\infty$, $\pm 0$, or NaN;

B) allocating at least a first data input device for storing a desired value of j;

C) allocating at least a first data input device for storing a desired value of m;

D) allocating at least a first data manipulation and storage device that includes a read-only memory storage unit for determining b such that $b \approx$ reciprocal of the $j^{th}$ root of S;

E) allocating at least a first manipulation and storage device for determining $b^j$ such that b is raised to the power of j;

F) allocating at least a first data manipulation device for determining x such that $x=S*b^j$;

G) allocating at least a first data manipulation and storage device for determining d such that $d=f_j[m](x)$ wherein:

$f_j[m](x)=1+A_1x+A_2x^2+A_3x^3\ldots+A_{m-1}x^{m-1}$ represents a $m-1^{th}$ polynomial that is an approximate solution of an error equation $x*\{f_j[m](x)\}^j=1-\Delta^m;$ $\Delta=1-x$, where $0<x<2$;

upon substitution of $1-\Delta$ in place of x, expansion of $f_j[m](x)$, now represented as $f_j[m](\Delta)$, multiplication by $(1-\Delta)$, elimination of all terms that contain $\Delta^p$ such that $p<m$ to obtain an equation of the form $$1+g_1\Delta^1+g_2\Delta^2+g_3\Delta^3\ldots+g_m\Delta^m=1-k\Delta^m$$

where $g_1, g_2, g_3 \ldots g_m$ are expressions for the coefficients of the $\Delta, \Delta^2, \Delta^3, \ldots \Delta^m$ terms, setting the coefficients $g_1$ through and including $g_{m-1}$ equal to zero to obtain solutions for $A_1$ through and including $A_{m-1}$, substituting $(1-x)$ in place of $\Delta$ to obtain an equation of the form $$f_j[m](x) = 1 + K_1 x + K_2 x^2 + K_3 x^3 \ldots + K_{m-1} x^{m-1},$$

such that convergence factor $d = f_j[m](x)$;

H) allocating at least a first data input and manipulation device for determining $d^j$ such that d is raised to the power of j;

I) allocating at least a first data input and manipulation device for determining a new x such that $x = x * d^j$; and J) allocating at least a first data input and manipulation device for determining a new b such that $b = b * d$ that appears as an output electrical signal.

10. The method of claim 9, further including data manipulation and storage devices for iterating steps G, H, I and J until a solution with a desired degree of accuracy is obtained as an electrical output signal.

11. An improvement in digital signal processing methods for improving allocation of resources among a plurality of data input, data storage and data manipulation devices so as to achieve greater efficiency in determining a reciprocal $j^{th}$ root approximation of an input value S other than $S = \pm \infty$, $\pm 0$, or NaN, utilizing a desired convergence rate m which includes the steps of:

A) allocating at least a first data storage and manipulation device for selection and storage of an input value other than $\pm \infty$, $\pm 0$, or NaN;

B) allocating at least a first data storage and manipulation device for a second input value equal to a desired value of j;

C) allocating at least a first data storage and manipulation device for a third input value equal to a desired value of m;

D) allocating at least a first data storage and manipulation device that includes a ready-only memory storage unit for determining b such that $b \approx$ a reciprocal of a $j^{th}$ root of the selected input value;

E) utilizing an approximate solution of an error equation $x * \{f_j[m](x)\}^j = 1 - \Delta^m$, wherein:

$x = S * b^j$;

$f_j[m](x) = 1 + A_1 x + A_2 x^2 + A_3 x^3 \ldots + A_{m-1} x^{m-1}$ represents a $m-1^{th}$ polynomial that is an approximate solution of the error equation;

the $f_j[m](x)$ polynomial is converted to an m−1th polynomial in $\Delta$, $f_j[m](\Delta)$, utilizing substitution of $x = 1 - \Delta$, where $0 < x < 2$;

such that a convergence factor $d = f_j[m](x)$ is determined;

F) utilizing the convergence factor d to obtain a new x such that $x = x * d^j$;

G) utilizing the convergence factor d to obtain a new b such that $b = b * d$; and H) iterating steps E, F, and G until a solution with a desired degree of accuracy is obtained.

12. A system for maximizing time and resource efficiency of a computation process, for use with a digital computer in accordance with a strategy utilizing an approximation process, said system comprising:

A) process control devices for controlling the computation process in response to control signal sets;

B) a plurality of sensors for sensing inputs affecting operation of the computation process;

C) a controller, having a ready-only memory storage unit, responsive to said sensors and process control devices for providing a more efficient process, said controller including means:

for manipulating an input value S such that $S \neq \pm \infty$, $\pm 0$, or Not-a-Number, an input value j reflecting a magnitude of j for a desired $j^{th}$ root of the input value S, and an input value m reflecting a desired convergence rate, in accordance with an error equation $$x * \{f_j[m](x)\}^j = 1 - \Delta^m$$

alternatively considered as $$(1-\Delta) * \{f_j[m](\Delta)\}^j = 1 - \Delta^m$$

wherein $\Delta = 1 - x$, $f_j[m](x)$ is an $m-1^{th}$ polynomial in x expressible as $1 + A_1 x + A_2 x^2 + A_3 x^3 \ldots + A_{m-1} x^{m-1}$, that is converted to $f_j[m](\Delta)$, an $m-1^{th}$ polynomial in $\Delta$, expressible as $1 + A_1 \Delta^1 + A_2 \Delta^2 + A_3 \Delta^3 \ldots + A_{m-1} \Delta^{m-1}$, such that upon expanding and multiplying as indicated, obtaining an equation containing one plus various powers of $\Delta$ that possess coefficients, an approximation strategy is employed in which terms containing $\Delta^p$ such that $p > m$ are eliminated and coefficients of terms containing $\Delta^n$ such that $n < m$ are set to zero, allowing expression of $f_j[m](x)$ in the form of $1 + K_1 x + K_2 x^2 + K_3 x^3 \ldots + K_{m-1} x^{m-1}$ where the values of the K's are specifiable for selected desired inputs, to obtain a convergence factor $d = f_j[m](x)$ that is utilized to compute a new $x = x * d^j$ and a new $b = b * d$, including means for iteration of computation of d, x and b so as to achieve time and resource efficient utilization within said digital computer system.

* * * * *

UNITED STATES PATENT AND TRADEMARK OFFICE
CERTIFICATE OF CORRECTION

PATENT NO. : 5,253,215
DATED : October 12, 1993
INVENTOR(S) : Brett L. Lindsley

It is certified that error appears in the above-identified patent and that said Letters Patent is hereby corrected as shown below:

At column 10, line 4, "(1/3)x." should be --(1/3)x... .--.
At column 10, line 22, "(2/9)x$^2$." should be --(2/9)x$^2$... .--.

Signed and Sealed this

Ninth Day of May, 1995

Attest:

BRUCE LEHMAN

Attesting Officer

Commissioner of Patents and Trademarks